(12) United States Patent
Liang et al.

(10) Patent No.: US 12,253,962 B2
(45) Date of Patent: Mar. 18, 2025

(54) NETWORK INTERFACE CONTROLLER CONFIGURATION METHOD, APPARATUS, DEVICE, AND STORAGE MEDIUM

(71) Applicant: Beijing Volcano Engine Technology Co., Ltd., Beijing (CN)

(72) Inventors: Yingxin Liang, Beijing (CN); Zhiyong Ye, Beijing (CN)

(73) Assignee: Beijing Volcano Engine Technology Co., Ltd., Beijing (CN)

(*) Notice: Subject to any disclaimer, the term of this patent is extended or adjusted under 35 U.S.C. 154(b) by 0 days.

(21) Appl. No.: 18/630,597

(22) Filed: Apr. 9, 2024

(65) Prior Publication Data
US 2024/0256474 A1  Aug. 1, 2024

Related U.S. Application Data

(63) Continuation of application No. PCT/CN2023/076039, filed on Feb. 15, 2023.

(30) Foreign Application Priority Data

Feb. 16, 2022 (CN) .......................... 202210142679.2

(51) Int. Cl.
G06F 13/24 (2006.01)
(52) U.S. Cl.
CPC .................................. G06F 13/24 (2013.01)
(58) Field of Classification Search
CPC ........ G06F 13/24; G06F 1/3296; G06F 13/26; H04L 45/302
See application file for complete search history.

(56) References Cited

U.S. PATENT DOCUMENTS

| | | | | |
|---|---|---|---|---|
| 5,802,272 A | * | 9/1998 | Sites ................... | G06F 11/3466 714/E11.212 |
| 5,974,536 A | * | 10/1999 | Richardson ......... | G06F 11/3452 714/E11.2 |

(Continued)

FOREIGN PATENT DOCUMENTS

| | | |
|---|---|---|
| CN | 106101019 A | 11/2016 |
| CN | 107704421 A | 2/2018 |

(Continued)

OTHER PUBLICATIONS

International Patent Application No. PCT/CN2023/076039; Int'l Search Report; dated May 29, 2023; 2 pages.

*Primary Examiner* — Henry Tsai
*Assistant Examiner* — Kim T Huynh
(74) *Attorney, Agent, or Firm* — BakerHostetler

(57) ABSTRACT

Embodiments of the present disclosure relate to network interface controller configuration. The method comprises: determining a network interface controller queue to be subjected to affinity setting in a target network interface controller; determining a NUMA node corresponding to the target network interface controller and a Die set corresponding to the node; binding a first network interface controller queue to be subjected to affinity setting with a CPU on a first Die in the Die set; and binding the RPS/XPS of a first interrupt request number corresponding to the first network interface controller queue to be subjected to affinity setting with the CPU on the first Die. By binding the RPS/XPS of an interrupt request number corresponding to the network interface controller queue and the network interface controller queue bound with a same Die, the cache hit ratio and thus the network interface controller performance can be improved.

18 Claims, 3 Drawing Sheets

(56) References Cited

U.S. PATENT DOCUMENTS

| | | | |
|---|---|---|---|
| 9,912,561 B1* | 3/2018 | Chukka | H04L 43/10 |
| 2011/0023042 A1* | 1/2011 | Pope | H04L 67/02 |
| | | | 709/224 |
| 2015/0339168 A1 | 11/2015 | Mason | |
| 2017/0289024 A1* | 10/2017 | Bernat | H04L 47/20 |
| 2023/0222018 A1* | 7/2023 | Zhu | G06F 9/546 |
| | | | 719/313 |
| 2023/0418662 A1* | 12/2023 | Fredette | G06F 9/4875 |

FOREIGN PATENT DOCUMENTS

| | | |
|---|---|---|
| CN | 109840147 A | 6/2019 |
| CN | 111813547 A | 10/2020 |
| CN | 112306693 A | 2/2021 |
| CN | 114490085 A | 5/2022 |

\* cited by examiner

NETWORK INTERFACE CONTROLLER CONFIGURATION METHOD, APPARATUS, DEVICE, AND STORAGE MEDIUM

CROSS REFERENCE

This application is a continuation of International Application No. PCT/CN2023/076039, filed on Feb. 15, 2023, which claims priority to Chinese Patent Application No. 202210142679.2 filed on Feb. 16, 2022, and entitled "Network Interface Controller Configuration Method, Apparatus, Device, and Storage Medium," both of which are incorporated herein by reference in their entireties.

FIELD

The present disclosure relates to the field of data storage, and specifically, to a method, apparatus, device, and storage medium for network interface controller configuration.

BACKGROUND

With the rapid development of network technology, the application environment of network interface controllers has become increasingly complex. Enterprise applications have also put forward higher requirements for the performance of the server's network interface controller. The performance of the network interface controller determines the overall performance of the server to a certain extent. Therefore, it is important for enterprises providing simple and effective means of optimizing network interface controller performance is also the focus of future network services.

Among the current related technologies, the Linux interrupt binding scheme under multi-core processor systems mainly uses the Irqbalance service. Specifically, based on the idle Central Processing Unit (CPU) in the current system, it is selected to handle interrupts. The requested CPU means that interrupt requests are randomly assigned to idle CPUs. It can be seen that the allocation of interrupt requests is not directed, resulting in a low hit rate of cached data, thus affecting the performance of the network interface controller.

SUMMARY

In order to solve the above technical problems, embodiments of the present disclosure provide a method for network interface controller configuration, which performs directed binding to the network interface controller queue and binds the RPS/XPS of the interrupt number corresponding to the network interface controller queue and the network interface controller queue to the same die. CPUs on the same die share the cache, so the cache hit rate can be improved, thereby improving the overall network interface controller performance.

In a first aspect, embodiments of the present disclosure provide a method for network interface controller configuration, comprising: determining queues of network interface controllers to be subjected to affinity setting in a target network interface controller, wherein the queues of network interface controllers to be subjected to affinity setting have corresponding relationship with at least one interrupt number, an interrupt number used to identify a type of an interrupt request; determining a non-uniform memory access (NUMA) node corresponding to the target network interface controller, and a die set corresponding to the NUMA node; wherein the die set comprises at least one die, each die comprising a plurality of central processing units (CPUs) sharing a same cache; binding a first queue of network interface controllers to be subjected to affinity setting with a CPU on a first die in the die set, wherein the first die is any die in the die set; determining an interrupt number corresponding to the first queue of network interface controllers to be subjected to affinity setting as a first interrupt number; and binding a receive packet steering (RPS) of the first interrupt number and/or a transmit packet steering (XPS) of the first interrupt number with the CPU on the first die.

In an optional implementation, prior to the binding a first queue of network interface controllers to be subjected to affinity setting with a CPU on a first die in the die set, the method further comprises: determining a total number of interrupt numbers corresponding to the queue of network interface controllers to be subjected to affinity setting in the target network interface controller, and a number of dies in the die set corresponding to the NUMA node; and grouping, based on the total number of interrupt numbers and the number of dies, the queues of the network interface controllers to be subjected to affinity setting in the target network interface controller to obtain at least one group. Accordingly, binding the first queue of network interface controllers to be subjected to affinity setting to the CPU on the first die in the die set comprises: binding the queue of network interface controllers to be subjected to affinity setting included in a first group of the at least one group with the CPU on the first die in the die set, wherein the first group includes a first queue of network interface controllers to be subjected to affinity setting.

In an optional implementation, prior to the binding a receive packet steering (RPS) of the first interrupt number and/or a transmit packet steering (XPS) of the first interrupt number with the CPU on the first die, the method further comprises: determining the CPU bound with the first queue of network interface controllers to be subjected to affinity setting on the first die as a first CPU; and binding the RPS and/or XPS of the first interrupt number to the first CPU.

In an optional implementation, each CPU is divided into at least two hyper-threads (HTs), and the binding a first queue of network interface controllers to be subjected to affinity setting with a CPU on a first die in the die set comprises: binding the first queue of network interface controllers to be subjected to affinity setting to a first HT on the first die in the die set; and wherein the binding a receive packet steering (RPS) of the first interrupt number and/or a transmit packet steering (XPS) of the first interrupt number with the CPU on the first die comprises: binding the RPS and/or XPS of the first interrupt number to the CPU where the first HT is located.

In an optional implementation, prior to the binding a first queue of network interface controllers to be subjected to affinity setting with a CPU on a first die in the die set, the method further comprises: determining a die in the die set running an application (APP) corresponding to the first queue of network interface controllers to be subjected to affinity setting, as the first die.

In an optional implementation, prior to the binding a first queue of network interface controllers to be subjected to affinity setting with a CPU on a first die in the die set, the method further comprises: detect whether an interrupt request balancing (Irqbalance) service is enabled on the target network interface controller, wherein the Irqbalance service is used for allocation of interrupt requests based on interrupt load balancing on a CPU; and in response to a determination that the target network interface controller is in a state where the Irqbalance service is enabled, disabling the Irqbalance service.

In a second aspect, embodiments of the present disclosure provide an apparatus for network interface controller configuration, comprising: a first determination module configured to determine queues of network interface controllers to be subjected to affinity setting in a target network interface controller, wherein the queues of network interface controllers to be subjected to affinity setting have corresponding relationship with at least one interrupt number, an interrupt number used to identify a type of an interrupt request; a second determination module configured to determine a non-uniform memory access (NUMA) node corresponding to the target network interface controller, and a die set corresponding to the NUMA node; wherein the die set comprises at least one die, each die comprising a plurality of central processing units (CPUs) sharing a same cache; a first binding module configured to bind a first queue of network interface controllers to be subjected to affinity setting with a CPU on a first die in the die set, wherein the first die is any die in the die set; a third determination module configured to determine an interrupt number corresponding to the first queue of network interface controllers to be subjected to affinity setting as a first interrupt number; and a second binding module configured to bind a receive packet steering (RPS) of the first interrupt number and/or a transmit packet steering (XPS) of the first interrupt number with the CPU on the first die.

In a third aspect, embodiments of the present disclosure provide computer-readable storage medium storing instructions, the instructions, when executed on a terminal device, causing the terminal device to implement the above method.

In a fourth aspect, embodiments of the present disclosure provide a device for network interface controller configuration, comprising a memory, a processor, and a computer program stored in the memory and executable on the processor, the computer program, when executed by the processor, implementing the above method.

In a fifth aspect, embodiments of the present disclosure provide a computer program product comprising a computer program/instructions, and the computer program/instructions, when executed by a processor, implementing the above method.

Compared with the conventional technologies, the technical solution provided by the embodiments of the present disclosure has at least the following advantages.

According to embodiments of the present disclosure, the queue of network interface controllers to be subjected to affinity setting in the target network interface controller is first determined, where the queue of network interface controllers to be subjected to affinity setting has corresponding relationship with at least one interrupt number. The interrupt number is used to identify the type of interrupt request. Then, the non-uniform memory access (NUMA) node corresponding to the target network interface controller and a die set corresponding to the NUMA node are determined, where the die set comprises at least one die, each die comprising a plurality of central processing units (CPUs) sharing a same cache. Then a first queue of network interface controllers to be subjected to affinity setting is bound with a CPU on a first die in the die set. The first die can be any die in the die set. An interrupt number corresponding to the first queue of network interface controllers to be subjected to affinity setting is determined as a first interrupt number. A receive packet steering (RPS) of the first interrupt number and/or a transmit packet steering (XPS) of the first interrupt number are bound with the CPU on the first die. It can be seen that the queues of network interface controllers are bound in a directed way, and RPS/XPS of the interrupt number corresponding to a queue of the network interface controllers is bound with the same die as the queue of the network interface controllers. Since the CPUs on the same die share the cache, the hit rate of the cache can be improved, thus improving overall network interface controller performance.

BRIEF DESCRIPTION OF THE DRAWINGS

The accompanying drawings, which are incorporated in and constitute a part of this specification, illustrate embodiments consistent with the disclosure and together with the description, serve to explain the principles of the disclosure.

In order to more clearly illustrate the embodiments of the present disclosure or the technical solutions in the prior art, the following will briefly introduce the drawings that need to be used in the description of the embodiments or the prior art. Apparently, for those of ordinary skill in the art, other drawings can also be obtained based on these drawings without incurring any creative effort.

DETAILED DESCRIPTION

Figure 1:
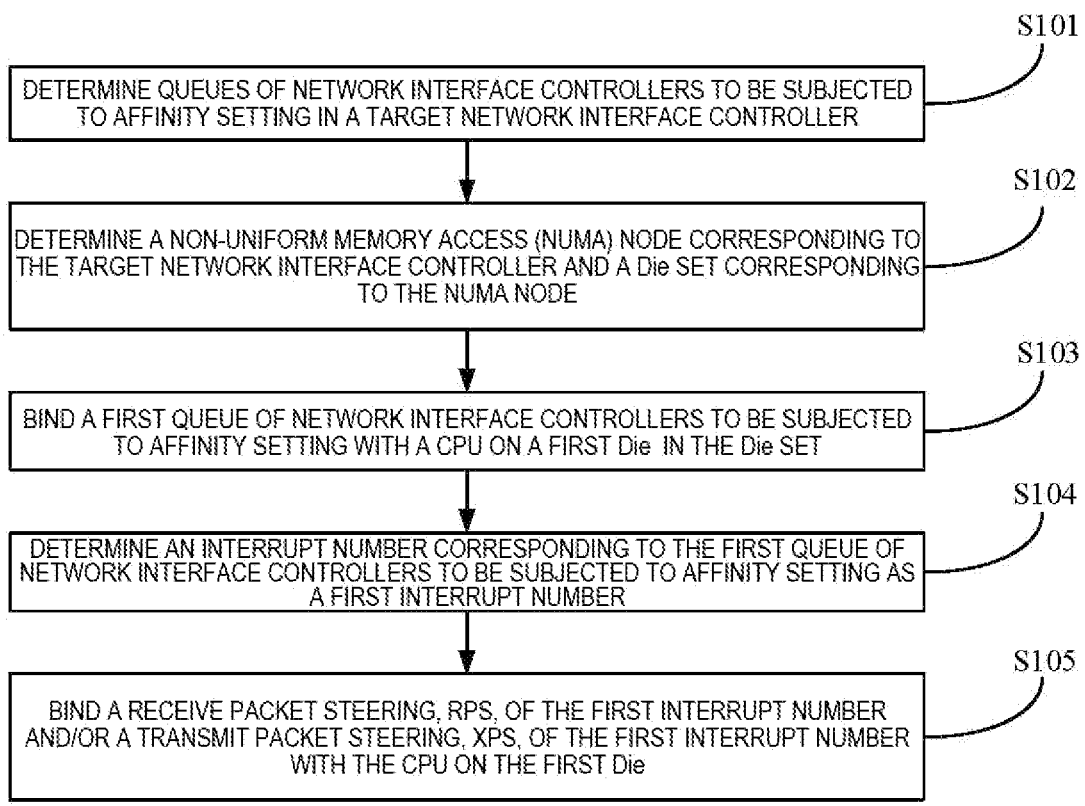
FIG. 1 is a flow chart of a method for network interface controller configuration according to embodiments of the present disclosure.

In order to understand the above objects, features and advantages of the present disclosure more clearly, the solutions of the present disclosure will be further described below. It should be noted that, as long as there is no conflict, the embodiments and features in the embodiments of the present disclosure can be combined with each other.

Many specific details are set forth in the following description to fully understand the present disclosure, but the present disclosure can also be implemented in other ways different from those described here; obviously, the embodiments in the description are only part of the embodiments of the disclosure, not all embodies.

With the rapid development of network technology, the application environment of network interface controllers has become increasingly complex. Enterprise applications have also put forward higher requirements for the performance of the server's network interface controller. The performance of the network interface controller determines the overall performance of the server to a certain extent. Therefore, it is important for enterprises providing simple and effective means of optimizing network interface controller performance is also the focus of future network services.

Among the current related technologies, the Linux interrupt binding scheme under multi-core processor systems mainly uses the Irqbalance service. Specifically, based on the idle Central Processing Unit (CPU) in the current system, it is selected to handle interrupts. The requested CPU means that interrupt requests are randomly assigned to idle CPUs. It can be seen that the allocation of interrupt requests is not directed, resulting in a low hit rate of cached data, thus affecting the performance of the network interface controller.

In order to improve the hit rate of cached data and thereby improve the performance of the network interface controller, embodiments of the present disclosure provide a method for network interface controller configuration. First, the queue of network interface controllers to be subjected to affinity setting in the target network interface controller is determined, where the queue of network interface controllers to be subjected to affinity setting has corresponding relationship with at least one interrupt number. The interrupt number is used to identify the type of interrupt request. Then, the non-uniform memory access (NUMA) node corresponding to the target network interface controller and a die set corresponding to the NUMA node are determined, where the die set comprises at least one die, each die comprising a plurality of central processing units (CPUs) sharing a same cache. Then a first queue of network interface controllers to be subjected to affinity setting is bound with a CPU on a first die in the die set. The first die can be any die in the die set. An interrupt number corresponding to the first queue of network interface controllers to be subjected to affinity setting is determined as a first interrupt number. A receive packet steering (RPS) of the first interrupt number and/or a transmit packet steering (XPS) of the first interrupt number are bound with the CPU on the first die. It can be seen that the queues of network interface controllers are bound in a directed way, and RPS/XPS of the interrupt number corresponding to a queue of the network interface controllers is bound with the same die as the queue of the network interface controllers. Since the CPUs on the same die share the cache, the hit rate of the cache can be improved, thus improving overall network interface controller performance.

Embodiments of the present disclosure provide a method for network interface controller configuration. Refer to FIG. 1, which is a flow chart of a method for network interface controller configuration provided by the disclosed embodiments. The method comprises:

S101: determine queues of network interface controllers to be subjected to affinity setting in a target network interface controller.

the queues of network interface controllers to be subjected to affinity setting have corresponding relationship with at least one interrupt number, and an interrupt number used to identify a type of an interrupt request.

In practice, a hard interrupt is an electrical signal. If something happens to the device, an interrupt is generated and the electrical signal is sent to the interrupt controller via the bus. In turn, the interrupt controller sends the electrical signal to the central processor/CPU, and the CPU will immediately stop the running task, jump to the entry address of the interrupt handler, and perform interrupt processing. The interrupt source that generates an interrupt request (Interrupt ReQuest, IRQ) may include hardware devices, such as network interface controllers, disks, keyboards, clocks, etc. The interrupt request signal generated by the interrupt source contains a specific identifier, which allows the computer to determine which device made the interrupt request. The interrupt request signal is the interrupt number. The interrupt number is the code assigned to each interrupt source by the system. The CPU needs to pass the interrupt number finds the entry address of the interrupt handler and implements interrupt processing.

In practice, a network interface controller is a piece of computer hardware designed to allow computers to communicate on a computer network. It can include single-queue network interface controllers and multi-queue network interface controllers. A multi-queue network interface controller refers to a network interface controller that includes a plurality of queues of network interface controllers.

In embodiments of the present disclosure, the target network interface controller is a multi-queue network interface controller. The target network interface controller has a supported maximum number of queues. The number of currently used queues of the target network interface controllers can be less than the maximum number of queues. The queues of the network interface controllers to be subjected to affinity setting in the target network interface controller can include all queues corresponding to the target network interface controller, a currently used queue corresponding to the target network interface controller, or a pre-specified part of the currently used queues, etc.

In an optional implementation, the queues of network interface controllers to be subjected to affinity setting in the target network interface controller are determined from the queues of the network interface controllers of the target network interface controller. In a Linux system, the ethtool command can be used to view the maximum number of queues supported by the target network interface controller and the number of currently used queues. For example, by use of the ethtool -l <dev> combined <queue #> command, it can be determined that the target network interface controller can support up to 63 queues of network interface controllers, indicating that the target network interface controller is a multi-queue network interface controller. It can be also determined that 16 network interface controller queues are currently used. Then, the 16 currently used network interface controller queues (such as queue0~queue15) can be determined as the queues of network interface controllers to be subjected to affinity setting in the target network interface controller.

In embodiments of the present disclosure, a queue of network interface controllers to be subjected to affinity setting can correspond to one or more interrupt numbers. An interrupt number is used to identify the type of interrupt request IRQ. If the number of queues of network interface controllers to be subjected to affinity setting is less than or equal to the available interrupt numbers, a queue of network interface controllers to be subjected to affinity setting can be corresponding to an interrupt number. If the number of queues of network interface controllers to be subjected to affinity setting is greater than the number of available interrupt numbers, one queue of network interface controllers to be subjected to affinity setting can correspond to a plurality of interrupt numbers. For example, assume that the computer system includes 16 available interrupt numbers (such as IRQ0~IRQ15), and if the queues of the network interface controller to be subjected to affinity setting in the determined target network interface controller include 14 queues (such as queue0~queue13), then one network interface controller to be subjected to affinity setting can correspond to one interrupt number (e.g., queue0 corresponding to IRQ0, queue13 corresponding to IRQ13, and so on).

S102: determine determining a non-uniform memory access (NUMA) node corresponding to the target network interface controller and a die set corresponding to the NUMA node.

The die set comprises at least one die, and each die includes a plurality of central processing units (CPUs) sharing a same cache.

In the embodiments of the present disclosure, Non-Uniform Memory Access (NUMA) can divide a computer into a plurality of nodes. Each node corresponds to a die set. A die set can contain one or more dies. Each die can contain a plurality of CPUs. Each die communicates with each other through I/O dies, and each NUMA node communicates with each other through interconnect modules.

In embodiments of the present disclosure, each CPU on the same die shares the same cache (Cache), also called L3 cache.

Figure 2:
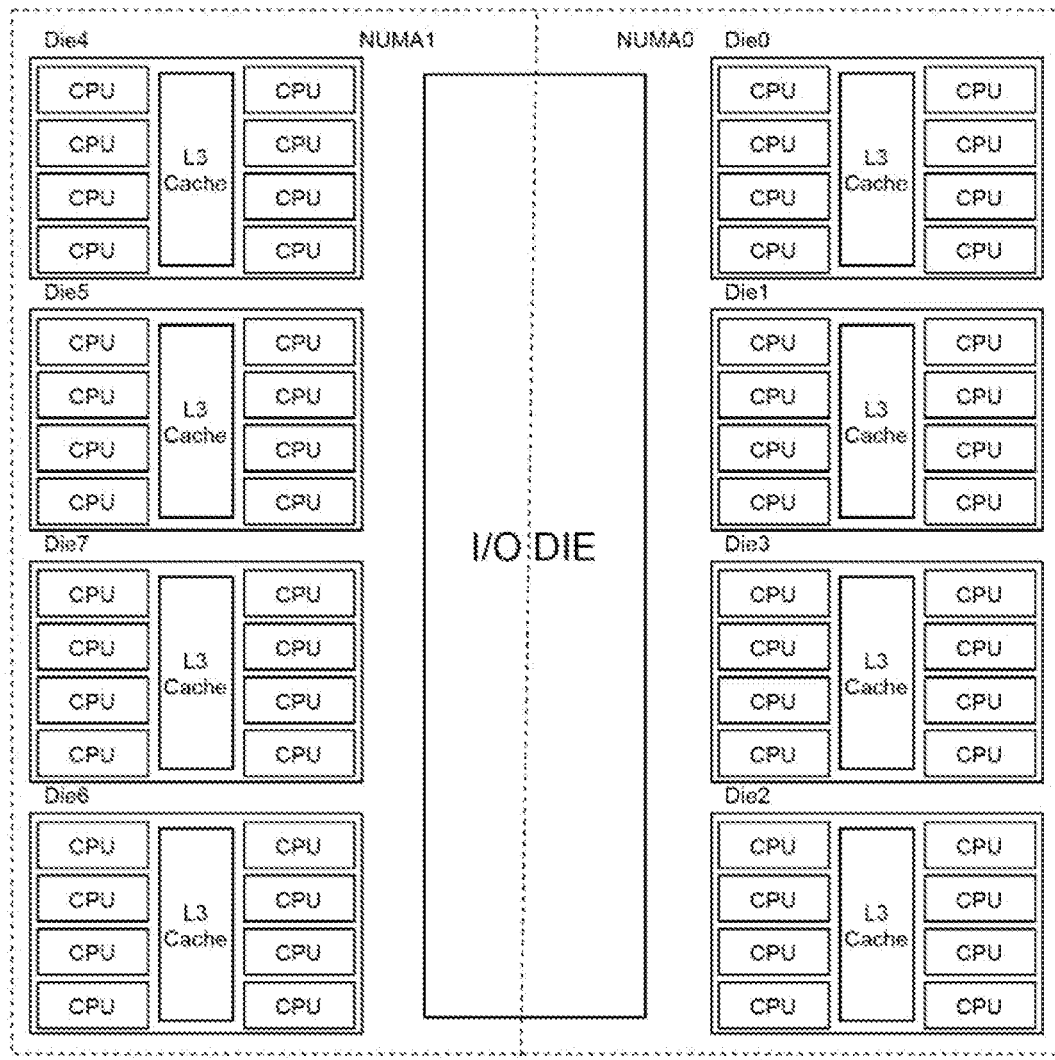
FIG. 2 is a schematic diagram of a die topology according to embodiments of the present disclosure.

FIG. 2 is a schematic diagram of a die topology provided for embodiments of the present disclosure. The NUMA divides the computer into two nodes (e.g., NUMA0, NUMA1), and the die set corresponding to each node contains 4 dies, where the die set corresponding to NUMA0 contains die0~Die3, and the die set corresponding to NUMA1 contains Die4~Die7. Each die contains 8 CPUs. The 8 CPUs on the same die share an L3 Cache, and each die is connected through I/O die communicates.

In the embodiments of the present disclosure, a target network interface controller corresponds to a NUMA node. After determining the NUMA node corresponding to the target network interface controller, the die set corresponding to the NUMA node can be determined. In a Linux system, /sys/class/net/<dev>/device/numa_node command can be used to determine the NUMA node corresponding to the target network interface controller. For example, assume that the computer contains two NUMA nodes (e.g., NUMA0, NUMA1), and each node is corresponding to a die set (such as the first die set and the second die set), each die set contains 4 dies (for example, the first set of dies contains die0~Die3; the second set of dies contains Die4~die7). By use of the above command, assuming that the NUMA node corresponding to the target network interface controller is determined to be NUMA1. Further, the second die set corresponding to NUMA1 can be determined, where the second set of dies includes Die4~Die7.

S103: bind the first queue of network interface controllers to be subjected to affinity setting to the CPU on the first die in the die set.

The first die is any die in the die set.

In the embodiments of the present disclosure, based on the queue of network interface controllers to be subjected to affinity setting determined in above S101 and the die set determined in above S102, each queue of network interface controllers to be subjected to affinity setting to the target network interface controller is bound with the CPUs on the die corresponding to the target network interface controller, so that all the interrupt requests corresponding to the same queue of network interface controllers to be subjected to affinity setting in the target network interface controller can be allocated to the CPUs bound with that queue of network interface controllers to be subjected to affinity setting for processing.

In an optional implementation, the first queue of network interface controllers to be subjected to affinity setting can be any queue of network interface controllers to be subjected to affinity setting in the target network interface controller, and the first die can be any die in the die set. According to the following steps A1-A3, the first queue of network interface controllers to be subjected to affinity setting can be bound with the CPU on the first die in the die set.

Step A1: determine the total number of interrupt numbers corresponding to the queue of the network interface controller to be subjected to affinity setting in the target network interface controller, and the number of dies in the die set corresponding to the NUMA node.

In this step, based on above S101, it is possible to determine the queues of network interface controllers to be subjected to affinity setting in the target network interface controller and the corresponding relationship between the queues of network interface controllers to be subjected to affinity setting and the interrupt number(s). The total number of interrupt numbers corresponding to the queue of network interface controllers to be subjected to affinity setting in the target network interface controller can be determined. For example, in the above example, it is determined that the queues of network interface controllers to be subjected to affinity setting in the target network interface controller includes 16 network interface controller queues (e.g., queue0~queue15), and each queue of network interface controllers to be subjected to affinity setting corresponds to an interrupt number. Then the network interface controllers to be subjected to affinity setting in the target network interface controller can be determined. The total number of interrupt numbers corresponding to the queue is 16.

In this step, based on above S102, the NUMA node corresponding to the target network interface controller and the die set corresponding to the NUMA node can be determined. The number of dies in the die set corresponding to the NUMA node can be determined. For example, in the above example, the die set corresponding to the target network interface controller is determined. The NUMA node is NUMA1, and the die set corresponding to NUMA1 contains 4 dies (such as Die4~Die7).

Step A2: based on the total number of interrupt numbers and the number of dies, group the queue of network interface controllers to be subjected to affinity setting in the target network interface controller to obtain at least one group.

In this step, based on the total number of interrupt numbers and the number of dies determined in above step A1, the queues of network interface controllers to be subjected to affinity setting in the target network interface controller are grouped. Specifically, the quotient of dividing the total number of interrupt numbers by the number of dies can be determined as the number of interrupt numbers corresponding to the group. Then the queues of the network interface controllers to be subjected to affinity setting corresponding to the interrupt numbers of each group are divided into one group. For example, in the above example, if the total number of interrupt numbers determined is 16 and the number of dies determined is 4, it can be determined that the queues of the network interface controller to be subjected to affinity setting in the target network interface controller can be divided into 4 groups, each group containing 4 interrupt numbers. The corresponding queue of network interface controllers to be subjected to affinity setting.

Step A3: bind the queues of network interface controllers to be subjected to affinity setting included in the first group in at least one group to the CPU on the first die in the die set.

The first group may be any queue group of network interface controllers to be subjected to affinity setting, and the first group includes the first queue of network interface controllers to be subjected to affinity setting.

In this step, based on the grouping in above step A2, the queues of network interface controllers to be subjected to affinity setting in the same group are bound with the CPUs on the same die in the die set. In some embodiments, the queues of network interface controllers to be subjected to affinity setting are not divided into the same group. It can be bound with different dies in the set of dies to achieve load balancing. For example, in the above example, the first group of queues of network interface controllers to be subjected to affinity setting (including queue0~queue3) are bound with the CPU on Die4; the second group of queues of network interface controllers to be subjected to affinity setting (including queue4~queue7) are bound with the CPU on Die5, the third group of queues of network interface controllers to be subjected to affinity setting (including queue8~queue11) are bound with the CPU on die6; the fourth group of queues of network interface controllers to be subjected to affinity setting (including queue12~queue15) are bound with the CPU on die7, and so on.

In an optional implementation, before binding the queues of network interface controllers to be subjected to affinity setting to the CPU on the die in the die set, it is first necessary to detect whether the interrupt request balancing Irqbalance service is enabled on the target network interface controller. If it is determined that the target network interface controller enables Irqbalance service status, the Irqbalance service shall be disabled to avoid invalid network interface controller configuration provided by embodiments of the present disclosure.

In practice, the interrupt request balancing Irqbalance service is used to optimize interrupt distribution and redistribute interrupts by periodically counting the interrupt load balancing situation on each CPU.

In embodiments of the present disclosure, it is first necessary to detect whether the Irqbalance service is enabled on the target network interface controller. If it is determined that the target network interface controller is in the state of enabling the Irqbalance service, the Irqbalance service needs to be disabled. In the Linux system, the Irqbalance service can be disabled by means of the systemctl stop irqbalance command. If the Irqbalance service was not disabled, the Irqbalance service should have automatically overwritten the affinity setting parameters according to embodiments of the present disclosure, causing the network interface controller configuration that binds the queue of network interface controllers to be subjected to affinity setting to the CPU on the die in the die set invalid.

S104: determine the interrupt number corresponding to the first queue of network interface controllers to be subjected to affinity setting as the first interrupt number.

In the embodiments of the present disclosure, based on the first queue of network interface controllers to be subjected to affinity setting determined in above S103 and corresponding relationship between the queues of network interface controllers to be subjected to affinity setting and the at least one interrupt number, one or more interrupt numbers corresponding to the first queue of network interface controllers to be subjected to affinity setting can be determined, and the interrupt number corresponding to the first queue of network interface controllers to be subjected to affinity setting can be used as the first interrupt number. For example, in the above example, if the first queue of network interface controllers to be subjected to affinity setting is queue0, and the first queue of network interface controllers queue0 to be subjected to affinity setting has a corresponding relationship with the interrupt number IRQ0, then IRQ0 can be used as the first interrupt number; if the first queue of network interface controllers to be subjected to affinity setting is queue7 and the first queue of network interface controllers to be subjected to affinity setting queue7 has a corresponding relationship with the interrupt number IRQ7, then IRQ7 can be used as the first interrupt number; and so on.

In the embodiments of the present disclosure, if the first queue of network interface controllers to be subjected to affinity setting has a corresponding relationship with a plurality of interrupt numbers, the first interrupt number may include a plurality of interrupt numbers. For example, if the first queue of network interface controllers to be subjected to affinity setting is queue1 and the queue of network interface controllers queue1 to be subjected to affinity setting has a corresponding relationship with the interrupt numbers IRQ1 and IRQ2, then IRQ1 and IRQ2 can be used as the first interrupt number. In binding the receive packet steering (RPS) of the first interrupt number and/or the transmit packet steering (XPS) of the first interrupt number to the CPU on the first die, it is necessary to respectively bind the receive packet steering (RPS) of the first interrupt number IRQ1 and/or the transmitting queue packet control stream (XPS) of the interrupt number IRQ1 to the CPU on the first die, and the receiving queue packet control stream (RPS) of the interrupt number IRQ2 and/or the transmitting queue packet control stream (XPS) of the interrupt number IRQ2 to the CPU on the first die.

S105: bind the receive packet steering (RPS) of the first interrupt number and/or the transmit packet steering (XPS) of the first interrupt number to the CPU on the first die.

In the embodiments of the present disclosure, one or more of the RPS (Receive Packet Steering) of the first interrupt number and the XPS (Transmit Packet Steering) of the first interrupt number are bound with the CPU on the first die bound with the first queue of network interface controllers to be subjected to affinity setting in S103. For example, in the above example, assuming that the first queue of network interface controllers to be subjected to affinity setting is queue0, the first interrupt number is determined to be IRQ0. Based on above S103, it is determined that the first die where the CPUs bound with queue0 are located is Die4, then the RPS and/or XPS of the first interrupt number IRQ0 are bound with any CPU on Die4. In the Linux system, the RPS binding can be done by editing the/sys/class/net/<dev>/queues/rx-<n>/rps_cpus file, and the for XPS binding can be done by editing the/sys/class/net/<dev>/queues/tx-<n>/xps_cpus file.

In an optional implementation, in binding the RPS of the first interrupt number and/or the XPS of the first interrupt number to the CPU on the first die, the CPUs on the first die can be further restricted to ensure that the CPU that processes the sending request and the CPU that sends the data packet are the same CPU. First, the CPU bound with the first queue of network interface controllers to be subjected to affinity setting is determined as the first CPU, and then the RPS and/or XPS of the first interrupt number are bound with the first CPU.

In the embodiments of the present disclosure, after determining the first CPU bound with the first queue of network interface controllers to be subjected to affinity setting, the RPS and/or XPS of the first interrupt number can be bound with the first CPU to ensure that the CPU that processes the sending request and the CPU that sends the packets are the same CPU.

In an optional implementation, each CPU can be divided into at least two hyper-threads (HTs), and the receive packet steering (RPS) and/or the transmit packet steering (XPS) of the first interrupt number can be bound with the CPU on the first die according to the following steps B1-B2.

Step B1: bind the first queue of network interface controllers to be subjected to affinity setting to the first HT on the first die in the die set.

In this step, each CPU can be divided into at least two hyper-threads (HTs). Two or more HTs in one CPU can run at the same time. For example, CPU0 on Die4 can be divided into two HTs. CPU32 and CPU160; CPU1 on Die4 can also be divided into two HTs. CPU34 and CPU162; and so on.

In this step, the first queue of network interface controllers to be subjected to affinity setting is bound with one of the HTs (assumed to be the first HT) of a CPU on the first die in the die set. For example, in the above example, assume that the first queue of network interface controllers to be subjected to affinity setting is queue0 and it is determined that the die in the die set corresponding to the first queue of network interface controllers queue0 to be subjected to affinity setting is Die4, where Die4 can include a plurality of CPUs (e.g., CPU0~CPU7), the first queue of network interface controllers queue0 to be subjected to affinity setting can be bound with one of the HTs (e.g., CPU32 or CPU160) of CPU0 on Die4.

Step B2: bind the receive packet steering (RPS) and/or transmit packet steering (XPS) of the first interrupt number to the CPU where the first HT is located.

In this step, one or more of the RPS of the first interrupt number and the XPS of the first interrupt number are bound with the CPU at which the first HT as determined in above step B1 is located. For example, if a CPU corresponds to two HTs, the RPS and/or XPS of the first interrupt number can be bound with another HT of the CPU where the first HT as determined in above step B1 is located. For example, in the above example, if the first queue of network interface controllers to be subjected to affinity setting is bound with one of the HTs (such as CPU32) of CPU0 on Die4, the RPS and/or XPS of the first interrupt number can be bound with another HT (such as CPU160) of CPU0, so that the queue of network interface controllers to be subjected to affinity setting and the RPS and/or XPS of its corresponding interrupt number can be bound on the same CPU, thereby improving the network interface controller performance.

According to the method for network interface controller configuration provided by embodiments of the present disclosure, the queue of network interface controllers to be subjected to affinity setting in the target network interface controller is first determined, where the queue of network interface controllers to be subjected to affinity setting has corresponding relationship with at least one interrupt number. The interrupt number is used to identify the type of interrupt request. Then, the non-uniform memory access (NUMA) node corresponding to the target network interface controller and a die set corresponding to the NUMA node are determined, where the die set comprises at least one die, each die comprising a plurality of central processing units (CPUs) sharing a same cache. Then a first queue of network interface controllers to be subjected to affinity setting is bound with a CPU on a first die in the die set. The first die can be any die in the die set. An interrupt number corresponding to the first queue of network interface controllers to be subjected to affinity setting is determined as a first interrupt number. A receive packet steering (RPS) of the first interrupt number and/or a transmit packet steering (XPS) of the first interrupt number are bound with the CPU on the first die. It can be seen that the queues of network interface controllers are bound in a directed way, and RPS/XPS of the interrupt number corresponding to a queue of the network interface controllers is bound with the same die as the queue of the network interface controllers. Since the CPUs on the same die share the cache, the hit rate of the cache can be improved, thus improving overall network interface controller performance.

Based on the above embodiments, in binding the queue of network interface controllers to be subjected to affinity setting to the CPU on the first die in the set of dies, it does not consider which CPU the application (APP) corresponding to the queue of network interface controllers to be subjected to affinity setting is running on. Therefore, there might be a problem that the CPU bound with the queue of network interface controllers to be subjected to affinity setting and the APP corresponding to the queue of network interface controllers to be subjected to affinity setting are not the same CPU. In this event, the cache cannot be fully utilized, affecting the cache hit rate and thus the network interface controller performance.

In an optional implementation, the queue of network interface controllers to be subjected to affinity setting can be bound with the CPU on the first die in the die set according to the following steps C1-C2.

Step C1: determine the die in the set of dies that runs the APP corresponding to the first queue of network interface controllers to be subjected to affinity setting, as a first die.

In this step, after determining the NUMA node corresponding to the target network interface controller and the die set corresponding to the NUMA node based on above S102, a die is determined from the die set where the CPU running the APP corresponding to the first queue of network interface controllers to be subjected to affinity setting is located, as the first die. The die running the APP corresponding to the first queue of network interface controllers to be subjected to affinity setting may include one or more dies.

For example, assume that based on the above S102, the determined NUMA node corresponding to the target network interface controller is NUMA1, and the determined die set corresponding to NUMA1 is the second set of dies including Die4~Die7. In the Linux system. RFS can record the CPU running the APP corresponding to the queue of the network interface controllers to be subjected to affinity setting in the table. Based on the global socket flow table (rps_sock_flow_table) and the device flow table (rps_dev_flow_table), a CPU that is used by the current flow can be determined from one or more CPUs running the APP corresponding to the first queue of network interface controllers to be subjected to affinity setting. Further, the die where the CPU is located is determined as the first die. For example, based on the global socket flow table and device flow table, from the one or more CPUs (e.g., CPU8 and CPU16) running the APP corresponding to the first queue of network interface controllers to be subjected to affinity setting, it is determined that the CPU used by the current flow is CPU8. Assume that CPU8 is located on Die5, and CPU16 is located on Die6. It can be determined that the first die running the APP corresponding to the first queue of network interface controllers to be subjected to affinity setting in the die set is Die5.

Step C2: bind the first queue of network interface controllers to be subjected to affinity setting to the CPU on the first die.

In this step, after determining the first die in the die set that runs the APP corresponding to the first queue of network interface controllers to be subjected to affinity setting, the first queue of network interface controllers to be subjected to affinity setting (such as queue0) and the CPU (CPU8) on the first die (such as Die5) are bound. Then the receive packet steering RPS of the interrupt number corresponding to the first queue of network interface controllers to be subjected to affinity setting to the CPU on the first die. For example, assume that the interrupt number corresponding to the first queue of network interface controllers to be subjected to affinity setting queue0 is IRQ0, and the receive packet steering (RPS) corresponding to the interrupt number IRQ0 is bound with CPU8 on Die5.

The disclosed embodiments can ensure that the CPU running the APP corresponding to the queue of network interface controllers to be subjected to affinity setting is the same CPU as the CPU where the hard interrupt subsequently interrupts data processing, thereby making full use of the CPU cache and improving the hit rate of cached data.

Figure 3:
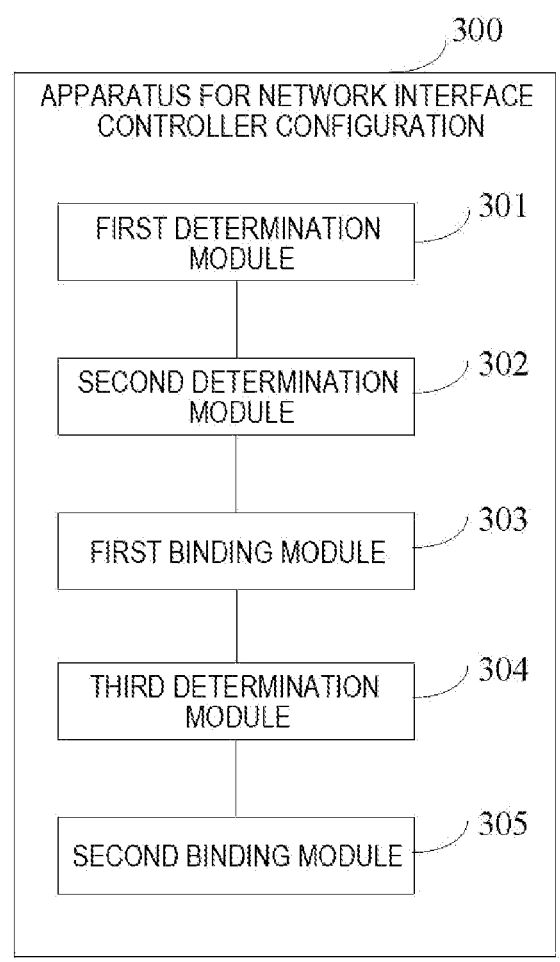
FIG. 3 is a schematic structural diagram of an apparatus for network interface controller configuration according to embodiments of the present disclosure.

Based on the same inventive concept as the above embodiments, embodiments of the present disclosure also provide a network interface controller configuration device. FIG. 3 is a schematic structural diagram of an apparatus for network interface controller configuration device according to embodiments of the present disclosure. The apparatus for network interface controller configuration 300 comprises:

A first determination module 301 configured to determine queues of network interface controllers to be subjected to affinity setting in a target network interface controller, wherein the queues of network interface controllers to be subjected to affinity setting have corresponding relationship with at least one interrupt number, an interrupt number used to identify a type of an interrupt request;

A second determination module 302 configured to determine a non-uniform memory access (NUMA) node corresponding to the target network interface controller, and a die set corresponding to the NUMA node; wherein the die set comprises at least one die, each die comprising a plurality of central processing units (CPUs) sharing a same cache;

A first binding module 303 configured to bind a first queue of network interface controllers to be subjected to affinity setting with a CPU on a first die in the die set, wherein the first die is any die in the die set;

A third determination module 304 configured to determine an interrupt number corresponding to the first queue of network interface controllers to be subjected to affinity setting as a first interrupt number; and A second binding module 305 configured to bind a receive packet steering (RPS) of the first interrupt number and/or a transmit packet steering (XPS) of the first interrupt number with the CPU on the first die.

In an optional implementation, the apparatus further comprises: a third determination module configured to determine a total number of interrupt numbers corresponding to the queue of network interface controllers to be subjected to affinity setting in the target network interface controller, and a number of dies in the die set corresponding to the NUMA node; and a grouping module configured to group, based on the total number of interrupt numbers and the number of dies, the queues of the network interface controllers to be subjected to affinity setting in the target network interface controller to obtain at least one group. Correspondingly, the first binding module 303 comprises a first binding submodule configured to bind the queue of network interface controllers to be subjected to affinity setting included in a first group of the at least one group with the CPU on the first die in the die set, wherein the first group includes a first queue of network interface controllers to be subjected to affinity setting.

In an optional implementation, the apparatus further comprises a fourth determination module configured to determine the CPU bound with the first queue of network interface controllers to be subjected to affinity setting on the first die as a first CPU. The third binding module is configured to bind the RPS and/or XPS of the first interrupt number to the first CPU.

In an optional implementation, each CPU is divided into at least two hyper-threads (HTs), and the first binding module 303 comprises a second binding submodule configured to bind the first queue of network interface controllers to be subjected to affinity setting to a first HT on the first die in the die set.

Correspondingly, the second binding module 305 comprises a third binding submodule configured to bind the RPS and/or XPS of the first interrupt number to the CPU where the first HT is located.

In an optional implementation, the apparatus further comprises a fifth determination module configured to determine, from the die set, a die running an application (APP) corresponding to the first queue of network interface controllers to be subjected to affinity setting, as the first die.

In an optional implementation, the apparatus further comprises: a detection module configured to detect whether an interrupt request balancing (Irqbalance) service is enabled on the target network interface controller, wherein the Irqbalance service is used for allocation of interrupt requests based on interrupt load balancing on a CPU; and a disabling module configured to disable the Irqbalance service in response to a determination that the target network interface controller is in a state where the Irqbalance service is enabled.

According to apparatus for the network interface controller configuration according to embodiments of the present disclosure, the queue of network interface controllers to be subjected to affinity setting in the target network interface controller is first determined, where the queue of network interface controllers to be subjected to affinity setting has corresponding relationship with at least one interrupt number. The interrupt number is used to identify the type of interrupt request. Then, the non-uniform memory access (NUMA) node corresponding to the target network interface controller and a die set corresponding to the NUMA node are determined, where the die set comprises at least one die, each die comprising a plurality of central processing units (CPUs) sharing a same cache. Then a first queue of network interface controllers to be subjected to affinity setting is bound with a CPU on a first die in the die set. The first die can be any die in the die set. An interrupt number corresponding to the first queue of network interface controllers to be subjected to affinity setting is determined as a first interrupt number. A receive packet steering (RPS) of the first interrupt number and/or a transmit packet steering (XPS) of the first interrupt number are bound with the CPU on the first die. It can be seen that the queues of network interface controllers are bound in a directed way, and RPS/XPS of the interrupt number corresponding to a queue of the network interface controllers is bound with the same die as the queue of the network interface controllers. Since the CPUs on the same die share the cache, the hit rate of the cache can be improved, thus improving overall network interface controller performance.

In addition to the above method and apparatus, embodiments of the present disclosure also provide a computer-readable storage medium. Instructions are stored in the computer-readable storage medium. When the instructions are run on a terminal device, the terminal device implements the present disclosure. The method for network interface controller configuration described in embodiments.

Embodiments of the disclosure also provide a computer program product. The computer program product includes a computer program/instruction. When the computer program/instructions are executed by a processor, the method for network interface controller configuration described in the embodiments of the disclosure is implemented.

Figure 4:
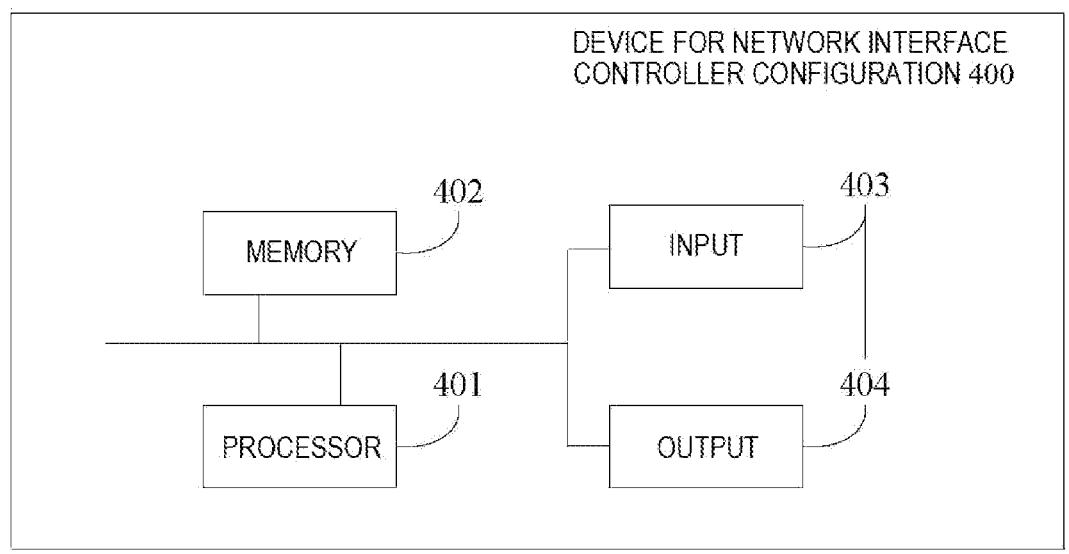
FIG. 4 is a schematic structural diagram of a device for network interface controller configuration according to embodiments of the present disclosure.

In addition, embodiments of the present disclosure also provide a device for network interface controller configuration 400, as shown in FIG. 4, which may comprise:

Processor 401, memory 402, input 403 and output 404. The number of processors 401 in the network interface controller configuration device can be one or more. In FIG. 4, one processor is taken as an example. In some embodiments of the present disclosure, the processor 401, the memory 402, the input 403, and the output 404 may be connected through a bus or other means. In FIG. 4, connection through a bus is taken as an example.

The memory 402 can be used to store software programs and modules. The processor 401 executes various functional applications and data processing of the network interface controller configuration device by running the software programs and modules stored in the memory 402. The memory 402 may mainly include a program storage area and a data storage area, where the program storage area may store an operating system, at least one application program required for a function, and the like. In addition, memory 402 may include high speed random-access memory, and may also include non-volatile memory, such as at least one magnetic disk storage device, flash memory device, or other volatile solid-state storage device. The input 403 may be used to receive input numeric or character information, and to generate signal input related to user settings and function control of the network interface controller configuration device.

Specifically in this embodiment, the processor 401 will follow the following instructions to load the executable files corresponding to the processes of one or more application programs into the memory 402, and the processor 401 will run the applications stored in the memory 402, program to realize various functions of the above network interface controller configuration equipment.

It should be noted that in this article, relational terms such as "first" and "second" are only used to distinguish one entity or operation from another entity or operation, and do not necessarily require or imply these There is no such actual relationship or sequence between entities or operations. Furthermore, the terms "comprises." "comprises." or any other variations thereof are intended to cover a non-exclusive inclusion such that a process, method, article, or apparatus that includes a list of elements includes not only those elements, but also those not expressly listed other elements, or elements inherent to the process, method, article or equipment. Without further limitation, an element defined by the statement "comprises a . . . " does not exclude the presence of additional identical elements in a process, method, article, or apparatus that includes the stated element.

The above description is only a detailed description of the present disclosure, enabling those skilled in the art to understand or implement the present disclosure. Various modifications to these embodiments will be apparent to those skilled in the art, and the general principles defined herein may be implemented in other embodiments without departing from the spirit or scope of the disclosure. Therefore, the present disclosure is not to be limited to the embodiments described herein but is to be accorded the widest scope consistent with the principles and novel features disclosed herein.

What is claimed is:

1. A method for network interface controller configuration, comprising:
    determining queues of network interface controllers to be subjected to affinity setting in a target network interface controller, wherein the queues of network interface controllers to be subjected to affinity setting have corresponding relationship with at least one interrupt number, an interrupt number used to identify a type of an interrupt request;
    determining a non-uniform memory access (NUMA) node corresponding to the target network interface controller, and a die set corresponding to the NUMA node, wherein the die set comprises at least one die, each die comprising a plurality of central processing units (CPUs) sharing a same cache;
    binding a first queue of network interface controllers to be subjected to affinity setting with a CPU on a first die in the die set, wherein the first die is any die in the die set;
    determining an interrupt number corresponding to the first queue of network interface controllers to be subjected to affinity setting as a first interrupt number; and
    binding a receive packet steering (RPS) of the first interrupt number and/or a transmit packet steering (XPS) of the first interrupt number with the CPU on the first die.

2. The method of claim 1, prior to the binding a first queue of network interface controllers to be subjected to affinity setting with a CPU on a first die in the die set, further comprising:
    determining a total number of interrupt numbers corresponding to the queue of network interface controllers to be subjected to affinity setting in the target network interface controller, and a number of dies in the die set corresponding to the NUMA node; and
    grouping, based on the total number of interrupt numbers and the number of dies, the queues of the network interface controllers to be subjected to affinity setting in the target network interface controller to obtain at least one group;
    wherein binding the first queue of network interface controllers to be subjected to affinity setting to the CPU on the first die in the die set comprises:
    binding the queue of network interface controllers to be subjected to affinity setting included in a first group of the at least one group with the CPU on the first die in the die set, wherein the first group includes a first queue of network interface controllers to be subjected to affinity setting.

3. The method of claim 1, prior to the binding a receive packet steering (RPS) of the first interrupt number and/or a transmit packet steering (XPS) of the first interrupt number with the CPU on the first die, further comprising:
    determining the CPU bound to the first queue of network interface controllers to be subjected to affinity setting on the first die as a first CPU;
    binding the RPS and/or XPS of the first interrupt number to the first CPU.

4. The method of claim 1, wherein each CPU is divided into at least two hyper-threads (HTs), and the binding a first queue of network interface controllers to be subjected to affinity setting with a CPU on a first die in the die set comprises:
    binding the first queue of network interface controllers to be subjected to affinity setting to a first HT on the first die in the die set;
    and wherein the binding a receive packet steering (RPS) of the first interrupt number and/or a transmit packet steering (XPS) of the first interrupt number with the CPU on the first die comprises:
    binding the RPS and/or XPS of the first interrupt number to the CPU where the first HT is located.

5. The method of claim 1, prior to the binding a first queue of network interface controllers to be subjected to affinity setting with a CPU on a first die in the die set, further comprising:

determining, from the die set, a die running an application (APP) corresponding to the first queue of network interface controllers to be subjected to affinity setting, as the first die.

6. The method of claim 1, prior to the binding a first queue of network interface controllers to be subjected to affinity setting with a CPU on a first die in the die set, further comprising:
   detecting whether an interrupt request balancing (Irqbalance) service is enabled on the target network interface controller, wherein the Irqbalance service is used for allocation of interrupt requests based on interrupt load balancing on a CPU; and
   in response to a determination that the target network interface controller is in a state where the Irqbalance service is enabled, disabling the Irqbalance service.

7. An electronic device comprising:
   a processor; and
   a memory storing instructions thereon, the instructions, when executed by the processor, causing the electronic devices to perform acts comprising:
      determining queues of network interface controllers to be subjected to affinity setting in a target network interface controller, wherein the queues of network interface controllers to be subjected to affinity setting have corresponding relationship with at least one interrupt number, an interrupt number used to identify a type of an interrupt request;
      determining a non-uniform memory access (NUMA) node corresponding to the target network interface controller, and a die set corresponding to the NUMA node, wherein the die set comprises at least one die, each die comprising a plurality of central processing units (CPUs) sharing a same cache;
      binding a first queue of network interface controllers to be subjected to affinity setting with a CPU on a first die in the die set, wherein the first die is any die in the die set;
      determining an interrupt number corresponding to the first queue of network interface controllers to be subjected to affinity setting as a first interrupt number; and
      binding a receive packet steering (RPS) of the first interrupt number and/or a transmit packet steering (XPS) of the first interrupt number with the CPU on the first die.

8. The electronic device of claim 7, the acts further comprising, prior to the binding a first queue of network interface controllers to be subjected to affinity setting with a CPU on a first die in the die set:
   determining a total number of interrupt numbers corresponding to the queue of network interface controllers to be subjected to affinity setting in the target network interface controller, and a number of dies in the die set corresponding to the NUMA node; and
   grouping, based on the total number of interrupt numbers and the number of dies, the queues of the network interface controllers to be subjected to affinity setting in the target network interface controller to obtain at least one group;
   wherein binding the first queue of network interface controllers to be subjected to affinity setting to the CPU on the first die in the die set comprises:
      binding the queue of network interface controllers to be subjected to affinity setting included in a first group of the at least one group with the CPU on the first die in the die set, wherein the first group includes a first queue of network interface controllers to be subjected to affinity setting.

9. The electronic device of claim 7, the acts further comprising, prior to the binding a receive packet steering (RPS) of the first interrupt number and/or a transmit packet steering (XPS) of the first interrupt number with the CPU on the first die:
   determining the CPU bound with the first queue of network interface controllers to be subjected to affinity setting on the first die as a first CPU; and
   binding the RPS and/or XPS of the first interrupt number to the first CPU.

10. The electronic device of claim 7, wherein each CPU is divided into at least two hyper-threads (HTs), and the binding a first queue of network interface controllers to be subjected to affinity setting with a CPU on a first die in the die set comprises binding the first queue of network interface controllers to be subjected to affinity setting to a first HT on the first die in the die set; and
   wherein the binding a receive packet steering (RPS) of the first interrupt number and/or a transmit packet steering (XPS) of the first interrupt number with the CPU on the first die comprises binding the RPS and/or XPS of the first interrupt number to the CPU where the first HT is located.

11. The electronic device of claim 7, the acts further comprising, prior to the binding a first queue of network interface controllers to be subjected to affinity setting with a CPU on a first die in the die set:
   determining, from the die set, a die running an application (APP) corresponding to the first queue of network interface controllers to be subjected to affinity setting, as the first die.

12. The electronic device of claim 7, the acts further comprising, prior to the binding a first queue of network interface controllers to be subjected to affinity setting with a CPU on a first die in the die set:
   detecting whether an interrupt request balancing (Irqbalance) service is enabled on the target network interface controller, wherein the Irqbalance service is used for allocation of interrupt requests based on interrupt load balancing on a CPU; and
   in response to a determination that the target network interface controller is in a state where the Irqbalance service is enabled, disabling the Irqbalance service.

13. A non-transitory computer-readable storage medium storing instructions, the instructions, when executed on an apparatus, causing the apparatus to implement a method comprising:
   determining queues of network interface controllers to be subjected to affinity setting in a target network interface controller, wherein the queues of network interface controllers to be subjected to affinity setting have corresponding relationship with at least one interrupt number, an interrupt number used to identify a type of an interrupt request;
   determining a non-uniform memory access (NUMA) node corresponding to the target network interface controller, and a die set corresponding to the NUMA node, wherein the die set comprises at least one die, each die comprising a plurality of central processing units (CPUs) sharing a same cache;
   binding a first queue of network interface controllers to be subjected to affinity setting with a CPU on a first die in the die set, wherein the first die is any die in the die set;

determining an interrupt number corresponding to the first queue of network interface controllers to be subjected to affinity setting as a first interrupt number; and binding a receive packet steering (RPS) of the first interrupt number and/or a transmit packet steering (XPS) of the first interrupt number with the CPU on the first die.

14. The non-transitory computer-readable storage medium of claim 13, prior to the binding a first queue of network interface controllers to be subjected to affinity setting with a CPU on a first die in the die set, the method further comprising:

determining a total number of interrupt numbers corresponding to the queue of network interface controllers to be subjected to affinity setting in the target network interface controller, and a number of dies in the die set corresponding to the NUMA node; and grouping, based on the total number of interrupt numbers and the number of dies, the queues of the network interface controllers to be subjected to affinity setting in the target network interface controller to obtain at least one group;

wherein binding the first queue of network interface controllers to be subjected to affinity setting to the CPU on the first die in the die set comprises:

binding the queue of network interface controllers to be subjected to affinity setting included in a first group of the at least one group with the CPU on the first die in the die set, wherein the first group includes a first queue of network interface controllers to be subjected to affinity setting.

15. The non-transitory computer-readable storage medium of claim 13, prior to the binding a receive packet steering (RPS) of the first interrupt number and/or a transmit packet steering (XPS) of the first interrupt number with the CPU on the first die, the method further comprising:

determining the CPU bound with the first queue of network interface controllers to be subjected to affinity setting on the first die as a first CPU;

binding the RPS and/or XPS of the first interrupt number to the first CPU.

16. The non-transitory computer-readable storage medium of claim 13, wherein each CPU is divided into at least two hyper-threads (HTs), and the binding a first queue of network interface controllers to be subjected to affinity setting with a CPU on a first die in the die set comprises:

binding the first queue of network interface controllers to be subjected to affinity setting to a first HT on the first die in the die set; and wherein the binding a receive packet steering (RPS) of the first interrupt number and/or a transmit packet steering (XPS) of the first interrupt number with the CPU on the first die comprises:

binding the RPS and/or XPS of the first interrupt number to the CPU where the first HT is located.

17. The non-transitory computer-readable storage medium of claim 13, prior to the binding a first queue of network interface controllers to be subjected to affinity setting with a CPU on a first die in the die set, the method further comprising:

determining, from the die set, a die running an application (APP) corresponding to the first queue of network interface controllers to be subjected to affinity setting, as the first die.

18. The non-transitory computer-readable storage medium of claim 13, prior to the binding a first queue of network interface controllers to be subjected to affinity setting with a CPU on a first die in the die set, the method further comprising:

detecting whether an interrupt request balancing (Irqbalance) service is enabled on the target network interface controller, wherein the Irqbalance service is used for allocation of interrupt requests based on interrupt load balancing on a CPU; and in response to a determination that the target network interface controller is in a state where the Irqbalance service is enabled, disabling the Irqbalance service.

* * * * *